United States Patent
Hansen

[11] Patent Number: 5,848,861
[45] Date of Patent: Dec. 15, 1998

[54] TOOL-BIT HOLDER AND METHOD OF MANUFACTURING SAME

[76] Inventor: Niels Jørgen Hansen, Vosemosegyden 4, DK-5250 Odense SV, Denmark

[21] Appl. No.: 776,053
[22] PCT Filed: Jul. 13, 1995
[86] PCT No.: PCT/DK95/00304
   § 371 Date: Jan. 17, 1997
   § 102(e) Date: Jan. 17, 1997
[87] PCT Pub. No.: WO96/03243
   PCT Pub. Date: Feb. 8, 1996

[30] Foreign Application Priority Data

Jul. 22, 1994 [DK] Denmark .................... 0870/94

[51] Int. Cl.⁶ .................................. B23B 47/00
[52] U.S. Cl. .................... 408/143; 408/144; 408/223
[58] Field of Search .................... 408/143, 144, 408/223, 224

[56] References Cited

U.S. PATENT DOCUMENTS

| 4,008,976 | 2/1977 | Holzl ................................ 408/144 |
| 4,553,884 | 11/1985 | Fitzgerald et al. . |
| 4,676,702 | 6/1987 | Reinauer ........................... 408/144 |
| 4,687,387 | 8/1987 | Roos ................................ 408/144 |
| 4,688,652 | 8/1987 | Crist ................................ 408/144 |
| 4,788,692 | 11/1988 | Takebayashi et al. . |
| 4,889,455 | 12/1989 | Karlsson et al. ................... 408/224 |
| 4,889,456 | 12/1989 | Killinger .......................... 408/224 |
| 4,903,785 | 2/1990 | Odoni et al. . |
| 5,049,011 | 9/1991 | Bohnet et al. ...................... 408/223 |
| 5,237,895 | 8/1993 | Danielsen . |
| 5,634,747 | 6/1997 | Tukala et al. ...................... 408/224 |
| 5,636,948 | 6/1997 | Rexius ............................. 408/224 |
| 5,676,499 | 10/1997 | Tukala ............................. 408/223 |
| 5,704,740 | 1/1998 | Ebenhoch et al. ................... 408/224 |

FOREIGN PATENT DOCUMENTS

| 0 313 044 | 4/1989 | European Pat. Off. . |
| 36 00 077 | 4/1987 | Germany . |
| 43 24 869 | 2/1994 | Germany . |
| 59-73215 | 4/1984 | Japan ............................... 408/224 |
| 5-8108 | 1/1993 | Japan ............................... 408/224 |
| 1 299 750 | 12/1972 | United Kingdom . |

OTHER PUBLICATIONS

"Metals Handbook Ninth Edition", vol. 1 Properties and Selection: Irons and Steels.

Primary Examiner—Daniel W. Howell
Assistant Examiner—Adesh Bhargava
Attorney, Agent, or Firm—Larson & Taylor

[57] ABSTRACT

A tool-bit holder (1) for tool bits (3, 5) of cemented carbide or other hard material, in which the tool-bit holder has vibration-damping properties and the bits are specifically oriented. In particular, the tool-bit holder (1) in all essentials consists of a material, e.g. mild steel, with vibration-damping properties. The effect achieved is that the tool-bit holder may be made in one piece. The vibration-damping properties makes it possible to place the bits (3, 5) in a manner which would otherwise cause instability and consequent machining marks on the workpiece.

5 Claims, 2 Drawing Sheets

TOOL-BIT HOLDER AND METHOD OF MANUFACTURING SAME

TECHNICAL FIELD

The present invention relates to an elongated tool-bit holder having vibration damping properties and a unique placement of bits.

BACKGROUND ART

A tool-bit holder with vibration-damping properties is disclosed in GB patent specification No. 1,299,750. With a view to achieving the vibration-damping properties, the tool-bit holder thus known is divided into two mutually coaxial rigid parts with an intermediate layer of "anti-vibration material", such as rubber. It will be obvious that, compared to the manufacturing of conventional tool-bit holders, known normally to be manufactured in one single piece of material, this construction causes a considerable increase in the cost of the manufacturing process.

Other attempts at changing the vibration characteristics of tool holders with a view to preventing instability or "chatter" are disclosed in U.S. Pat. Nos. 4,553,884 and 4,903,785. According to the former of these two specifications, an absorber package tuned to a particular frequency is inserted in the tool shaft, thus avoiding chatter at that particular frequency. According to the latter specification, a shank is divided so as to raise its "natural" frequency. Apart from being limited in their range of frequencies, these designs are expensive to manufacture and require careful adjustment to operate properly.

Further, U.S. Pat. No. 5,237,895 discloses a method of preventing "chatter" by supplementing the normal mechanical clamping with fluid-pressure clamping. Obviously, this design also is expensive and requires careful adjustment.

Further still, EP-A2-0,313,044 and DE-A1-4,324,869 disclose tool bits with a geometry intended to reduce chatter. Thus, these publications do not deal with the question of damping vibrations.

Finally, DE-A1-3,600,077 discloses an end-milling tool, in which the geometry of the bits enable the tool to be used for milling both in the axial and in the transverse directions. The question of vibrations is not dealt with.

DISCLOSURE OF THE INVENTION

On this background, it is the object of the invention to provide a tool-bit holder of the kind referred to initially, with which it is possible to achieve vibration-damping properties by extremely simple means, and this object is achieved by means of the feature set forth hereafter. By manufacturing the tool-bit holder in the form of one single piece of homogeneous material with known, not inconsiderable vibration-damping properties, a manufacturing process is achieved, that is no more complicated or expensive than the process of manufacturing the conventional tool-bit holders from e.g. tool steel, which—as is well known—possesses very low vibration-damping properties. At the same time, the vibration-damping effect as achieved with the arrangement of said GB patent specification No. 1,299,750 is retained.

It will be evident that a tool-bit holder manufactured from a material with considerably lower surface hardness than the hitherto known materials, such as tool steel, will be more vulnerable to wear from the chips produced during the machining of the workpiece concerned. This drawback is avoided by additionally providing the tool-bit holder with the feature set forth hereafter.

The invention also relates to a method of manufacturing a tool-bit holder according to the invention, and this method is characterized by the steps set forth hereafter. By proceeding in this manner, it is avoided that also the surfaces of the sockets, in which the tool bits are to be received, are given an increased surface hardness and consequently become less capable of "gripping" the bits.

Advantageous embodiments of the tool-bit holder and said method are also set forth hereafter.

BRIEF DESCRIPTION OF THE DRAWINGS

In the following, the invention is explained in more detail with reference to the exemplary embodiments of tool-bit holders according to the invention shown in the drawing, in which.

DESCRIPTION OF THE PREFERRED EMBODIMENT

Figure 1:
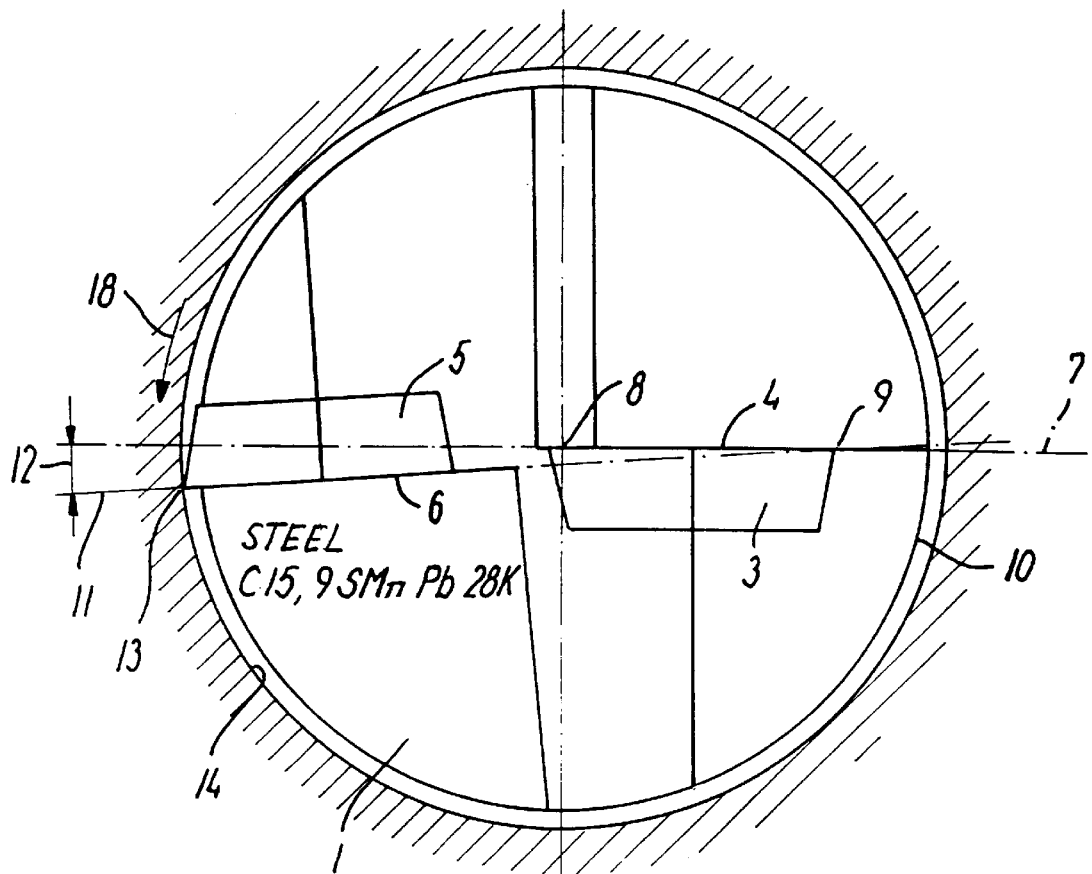
FIG. 1 is a front view in the direction of the arrow I in FIG. 2 of a drill in the form of a drill-bit holder with clamped-on tool bits, together with the hole being drilled in a workpiece.
Figure 2:
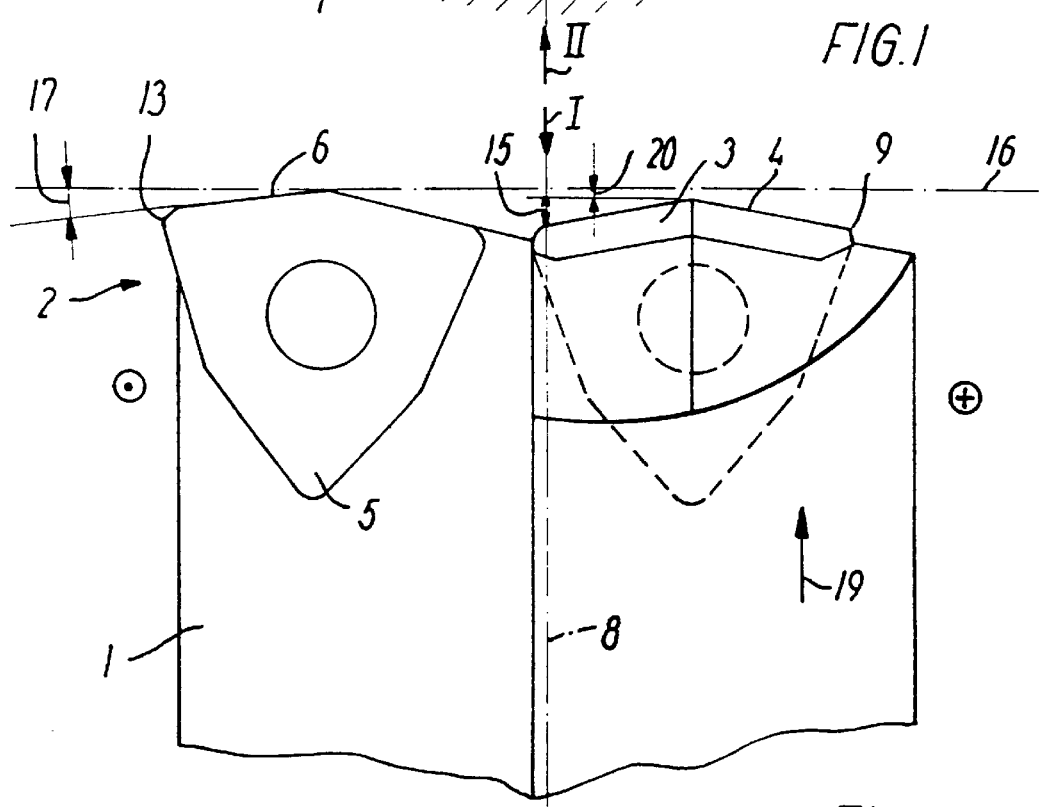
FIG. 2 is a side view in the direction of the arrow II in FIG. 1 of the drill shown in FIG. 1.

FIGS. 1 and 2 show the front end of a drill consisting of an elongated drill-bit holder 1, of which only the front end 2 is shown, and which in a roughly well-known manner supports two tool bits, viz. a first bit 3 with its associated first cutting edge 4 and a second bit 5 with its associated second cutting edge 6.

The tool bits 3 and 5 are in a manner known per se generally shaped like equilateral triangles, in which the corners are rounded and the sides are broken outwardly on the middle so as to give the cutting edges 4 and 6 a flattened V-shape. The bits 3 and 5 are secured to the drill-bit holder 1 in a manner known per se (not shown) so that they can be removed and turned and/or replaced.

As will be seen from FIG. 1, the first cutting edge 4 lies in a meridian plane 7 and extends from a position close to the drilling axis 8 to an outermost corner 9 at an appreciable distance from the periphery 10 of the drill support.

The second cutting edge 6 lies in an axial plane 11 intersecting the meridian plane 7 at the outermost corner 9 at an angle 12 of between 1° and 4°, the second cutting edge 6 extending from a position at an appreciable distance from the drilling axis 8 to an outermost corner 13 defining the periphery 14 of the hole being or having been drilled.

As will appear from FIG. 2, the two bits 3 and 5 are mutually axially offset in such a manner that the first bit 3, as reckoned in the feed direction 19 of the drill, is lagging by a small distance 20, i.e. that the load on the second bit 5 becomes greater. In addition, the bits are oriented about their central axes in such a manner that the innermost half of the first cutting edge 4 forms an angle 15 of between 8° and 10° with a radial plane 16, whereas the outermost half of the second cutting edge 6 forms an angle 17 of between 5° and 7° with this radial plane.

The positioning of the second bit 5, partly in the feeding direction 19 in front of the first bit 3, partly in the direction of rotation 18 in front of a symmetrical position relative to the first bit 3, causes the greatest cutting force to be on the second bit 5. If the drill-bit holder 1 consists of a material without vibration-damping properties, e.g. ordinary tool steel, the positioning of the second bit 5 relative to the first bit 3 as shown and described would make the drill consisting of the drill-bit holder 1 and the two tool bits 3 and 5 unstable, i.e. it would most probably execute torsional vibrations during a drilling operation, in a manner known per se causing the formation of machining marks in the periphery 14 of the hole being drilled and—not least—an intolerable noise and risk of damage to the tool bit.

Vibrations of this kind are avoided in the drill-bit holder according to the invention, since this holder is manufactured from a material with inherent vibration-damping properties, e.g. mild steel. Tests have shown that steel corresponding to C 15, 9 SMnPb 28K has such vibration-damping properties that vibrations of the kind referred to are avoided, leaving the periphery 14 of the hole drilled completely smooth. Other types of steel with similar vibration-damping properties may, of course, also be used.

To prevent wear on the drill-bit holder 1 due to the contact with the chips produced, the drill-bit holder may be treated to make its surface sufficiently hard to avoid such wear arising. If the drill-bit holder 1 consists of mild steel as mentioned above, this may easily be achieved by conventional case hardening, e.g. at a depth of approx. 0.5 mm and to a Rockwell-hardness of between 55 and 60. A further effect of this is that the chips slide more easily on the surfaces concerned, this being important especially in the case of deep holes, in which a "burning-on" may easily take place.

The invention may be used with the same effect on e.g. a stationary boring bar for use in a lathe, as also dealt with in the above-mentioned GB patent specification No. 1,299,750, and an example of this will now be described with reference to FIGS. 3 and 4.

Figure 3:
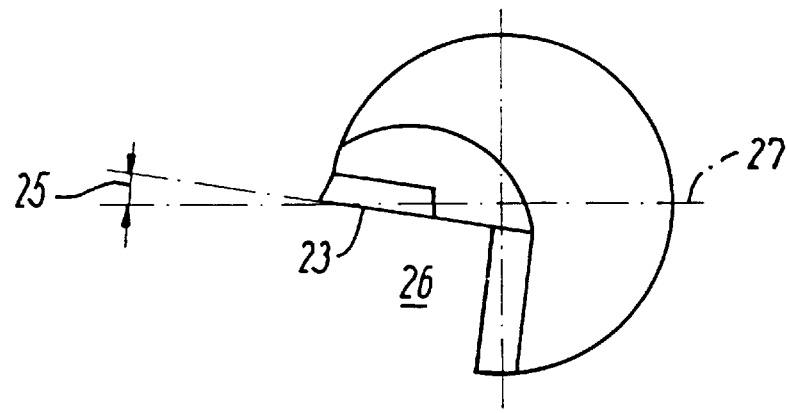
FIG. 3 shows a boring bar intended for use in a lathe, seen in the direction of the arrow III in FIG. 4, and FIG. 4, at a reduced scale, shows the boring bar of FIG. 3, seen in the direction of the arrow IV in FIG. 3.
Figure 4:
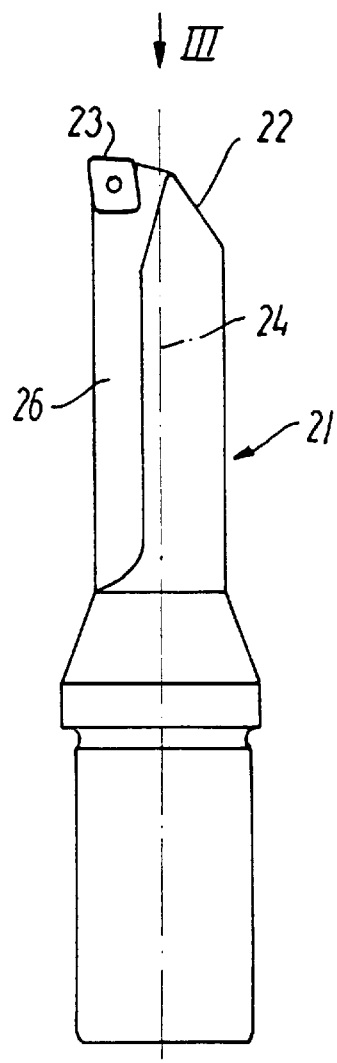

Thus, FIGS. 3 and 4 show a boring bar 21, to the front end 22 of which a single tool bit 23 is secured in the usual manner.

As will appear from FIG. 3, the cutting edge of the bit 23 forms an angle 25 of between 3° and 11° with a diametral plane 27 through the radially outermost edge of the bit, said bit lying in a plane generally parallel to the axis 24 of the boring bar 21, said axis 24 during use being substantially parallel to the rotation axis of the rotating workpiece (not shown), that the radially innermost corner of the cutting edge, as seen in the direction of rotation, lies somewhat ahead of the outermost one.

Such a positioning of the tool bit causes a good conveyance of the chips through the axially extending chip groove 26, but increases the risk of vibrations. Also in this case, however, this risk may be avoided by making the boring bar 21 fully or partly from vibration-damping material and possibly hardening certain surfaces, as explained above in the discussion of the exemplary embodiment shown in FIGS. 1 and 2.

The features relating to the combination of a tool-bit holder with vibration-damping properties and a positioning and orientation of the tool bit or bits, that would otherwise cause instability, are the subject of claims in the co-pending international patent application No. PCT/DK95/00303.

I claim:

1. An elongated tool-bit holder comprising:
    a rear end which is adapted to be secured to a part of a drilling tool;
    a front end adapted to be moved by the drilling tool in a direction of rotation about a drilling axis and in a direction of advance to drill a hole;
    a first tool bit having a first cutting edge and a second tool bit having a second cutting edge, said first and second tool bits being made of a hard material, said first and second cutting edges being of flat V-shape with a point, and said first and second tool bits being secured to said front end such that
    a) said first and second cutting edges face a direction of advance of said front end into a hole being drilled,
    b) said first cutting edge extends in a diametral plane from a position close to the drilling axis to a position spaced from a periphery of the hole being drilled,
    c) said second cutting edge extends from a position spaced from the drilling axis to the periphery of the hole being drilled,
    d) the points of said first and second V-shaped cutting edges face forward relative to the direction of advance,
    e) said second cutting edge is situated forward of said first cutting edge relative to the direction of advance, and
    f) said second cutting edge is situated in front of a symmetrical position with respect to said first cutting edge relative to the direction of rotation.

2. A tool-bit holder according to claim 1, wherein said holder is made of mild steel.

3. A tool-bit holder according to claim 2, wherein the mild steel is C15, 9 SMnPb 28K.

4. A tool-bit according to claim 1, wherein those surfaces during use being subjected to influence of chips produced in the machining are hardened.

5. A tool-bit holder as claimed in claim 1, wherein said first and second tool bits are further secured to said front end such that said second cutting edge extends in an axial plane tangent to a radially outermost point of said first cutting edge and such that the axial plane forms an angle of 1°–4° with a meridian plane extending through the outermost point of said first cutting edge.

* * * * *